A. F. & G. I. TERRY.
CULTIVATOR.
APPLICATION FILED OCT. 13, 1911.
1,187,870.
Patented June 20, 1916.
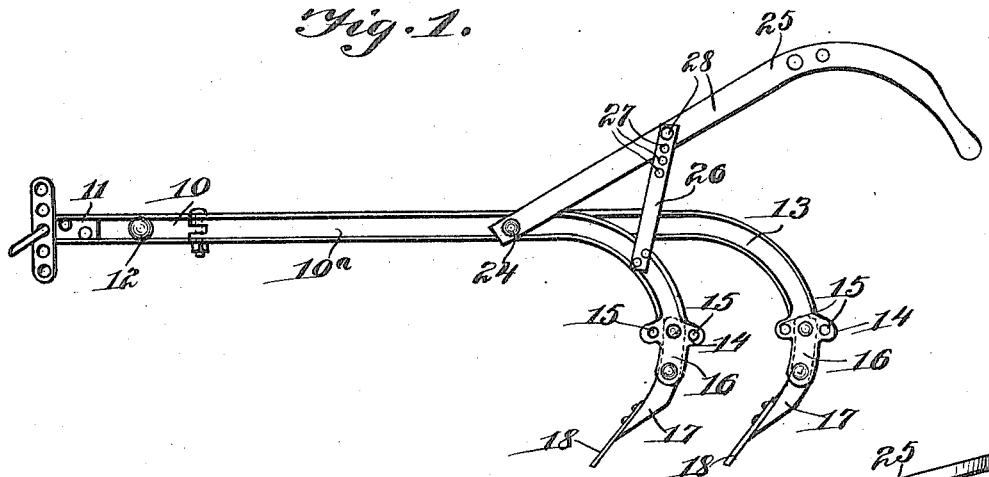
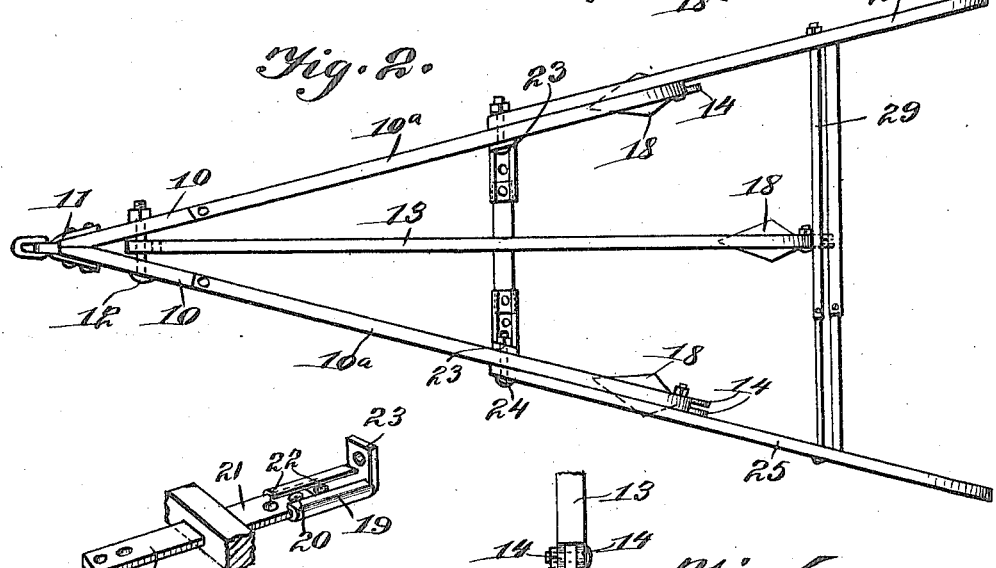
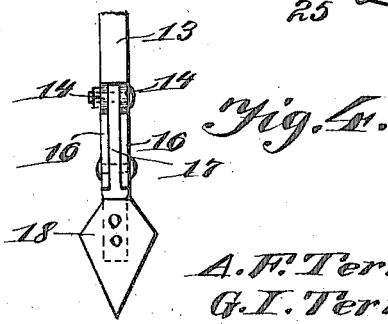
Witnesses
William C. Sinton
Charles L. Nelson
Inventors
A. F. Terry and
G. I. Terry.
By
Attorney

UNITED STATES PATENT OFFICE.

ALLEN F. TERRY AND GEORGE I. TERRY, OF ATHENS, ALABAMA.

CULTIVATOR.

1,187,870.  Specification of Letters Patent.  Patented June 20, 1916.

Application filed October 13, 1911. Serial No. 654,479.

*To all whom it may concern:*

Be it known that we, ALLEN F. TERRY and GEORGE I. TERRY, citizens of the United States, residing at Athens, in the county of Limestone and State of Alabama, have invented certain new and useful Improvements in Cultivators; and we do hereby declare the following to be a full, clear, and exact description of the invention, such as will enable others skilled in the art to which it appertains to make and use the same.

This invention relates to new and useful improvements in cultivators, and is designed to construct a device of this nature wherein the same may be adjustable to various widths of rows and heights of operators.

It has been heretofore found that in the ordinary or standard type of manual guided cultivators, that there has been no means of adjustment whereby the handles thereof may be raised or lowered to conform with the height of the operator.

It is the object of the present invention to overcome this objectionable feature, by providing a means whereby said handles may be raised or lowered to conform with the height of the operator, thereby increasing the accuracy and comfort with which the machine may be operated.

A further object of the present invention is to provide a cultivator which may be adaptable to the various widths of rows, in order to eliminate the necessity of operating upon the same row twice, which has been customary in widely separated rows.

With the above and other objects in view, this invention consists in the construction, combination and arrangement of parts, all as hereinafter more fully described, claimed and illustrated, wherein—

Figure 1 is a side elevation of a cultivator constructed in accordance with the present invention; Fig. 2 is a top plan view thereof; Fig. 3 is a perspective view of the bar providing the adjusting means for the cultivator bar; and Fig. 4 is a front elevation of the cultivator tooth, illustrating the manner in which the same is attached to the cultivator beam.

The cultivator forming the subject matter of the present invention comprises a pair of divergent cultivator beams hinged adjacent to the clevis through the instrumentality of which a swingle tree may be secured to the cultivator, having their rear terminals bent downwardly and cultivator teeth secured thereto in a manner which will hereinafter be more fully described. A rod extending through the extreme forward terminals of the converging cultivator beams has pivoted thereto for movement in vertical plane a single cultivator beam, which likewise has its rear terminal bent downwardly, and a cultivator tooth secured thereto. Adjusting means is interposed between the hinged portions of the divergent cultivator beams, and is of such construction that the divergency thereof may be regulated as well as the position of the central cultivator beam. The bolt securing this mechanism through the divergent cultivator beams likewise pivotally secures the handle to said divergent cultivator beams, said handles being adjustable in a vertical plane, as will hereinafter be more fully set forth and described.

Reference being had more particularly to the drawings, 10 indicates divergent cultivator beams constructed of angle irons and provided with the hinged portions $10^a$, the rear terminals of said hinged portions being curved downwardly, and provided with the cultivator teeth and attaching means, which will hereinafter be more fully described. The forward terminals of the converging arms 10 meet in the clevis 11 to which swingle trees may be secured, and are likewise secured and pressed together by the bolt 12 piercing the same, to which is pivotally connected the central cultivator beam 13. This beam extends rearwardly between the divergent beams $10^a$ and is likewise curved downwardly at its rear terminal, where is provided a cultivator tooth, the attaching means of which is similar to the cultivator teeth of the divergent arms, $10^a$. The downwardly bent terminals of the divergent beams $10^a$ and the central beam 13 are provided with the horizontal arms 14, which are pierced by the registering openings 15. A pair of vertical arms 16 extend below each side of the horizontal arms 14 and provide a pivotal point for the shank 17 and the cultivator teeth 18. The upper terminals of the shank 17 operate between the arms 14 and are retained at various angles to the pivotal point thereof by the bolt piercing said shank and the openings of said arms 14. From this construction it will readily be seen that the cultivator teeth may be set at any angle desired, and the depth of which the same operate in the ground may readily be regulated.

A socket 19, U-shape in cross section is secured to the inner surface of each of the pivotal sections 10ª of the beams 10, and have the base portions thereof pierced by the openings 20, said sockets adapted to receive the bar 21 which is interposed between the said divergent arms and is pierced by the adjusting openings 22, any one of which is adapted to register with the opening 20, if so desired, and be held in this position by the bolt which is adapted to pass through said registering coinciding opening. The central cultivator beam 13 is secured to the bar 21 in any suitable manner, preferably by having a bar pass through said cultivator beam in such a manner that there is sufficient play in said connections for the free movement of the central cultivator beam 13. The sockets 19 are provided with the upwardly bent portions 23 which are pierced by the bolts 24 to secure the sockets to the divergent hinged portion of the beams 10. These bolts form a pivotal connection between the handles 25 and the divergent pivotal sections 10ª of the cultivator beams 10.

In order to provide a means whereby the height of the handles 25 may be adjusted, a support 26 is rigidly secured to the rear terminals of each of the divergent hinged sections 10ª, and are pierced at their upper terminals by the bolts 27. The handles 25 operate in the interior of these rods and are adapted to be retained in various positions thereof by the bolts 28 piercing said arms and said rods. The width of the cultivator handles 25 is regulated by the telescopic rod 29, said rod being adjustable to the various widths to which the hinged sections 10ª are adjusted.

Having thus fully described our invention, what we claim as new and desire to secure by U. S. Letters Patent is:

In a cultivator construction, a hitch comprising a pair of converging bars, tongues formed upon the spaced ends of said bars, plow carrying beams having spaced tongues formed upon their forward ends for receiving said first named tongues therebetween, bolts pivotally connecting said tongues to permit of the lateral swinging movement of the beams, said tongues preventing independent oscillatory movement of said beams with respect to the hitch, angle plates secured to the inner sides of said beams and having horizontal portions extending from one beam toward the other, the edges of said horizontal portions being bent to form guiding grooves, a cross bar having its end seated in said guiding grooves and provided with spaced openings, said horizontal portions being provided with spaced openings, adapted for alinement with the spaced openings in the ends of said cross bar for adjustably connecting the cross bar to the angle plate.

In testimony whereof we affix our signatures in presence of two witnesses.

ALLEN F. TERRY.
GEORGE I. TERRY.

Witnesses:
WM. R. WALKER,
MARY MORGAN.

Copies of this patent may be obtained for five cents each, by addressing the "Commissioner of Patents. Washington, D. C."